Dec. 20, 1966  F. PERRUCA  3,292,443
DEVICES FOR REGULATING TRANSMISSION GEARS
Filed Nov. 24, 1964  2 Sheets-Sheet 1

Dec. 20, 1966   F. PERRUCA   3,292,443
DEVICES FOR REGULATING TRANSMISSION GEARS
Filed Nov. 24, 1964   2 Sheets-Sheet 2

United States Patent Office

3,292,443
Patented Dec. 20, 1966

3,292,443
DEVICES FOR REGULATING TRANSMISSION GEARS
Felix Perruca, Saint-Etienne, France, assignor to Societe Des Fabrications Unicum, Saint-Etienne (Loire), France, a French company
Filed Nov. 24, 1964, Ser. No. 413,508
Claims priority, application France, Dec. 5, 1963, 8,815, Patent 1,376,401
4 Claims. (Cl. 74—200)

This invention relates to devices for regulating transmission gears.

According to the present invention there is provided a device for regulating a transmission gear of variable velocity ratio, the device comprising a tube having a slot extending therealong, a support slidably mounted on the exterior of the tube, the support, serving for carrying an element whose movement changes the velocity ratio of the transmission gear, a rotatable screw arranged within the tube and extending along same, a nut threaded on the screw, and means guided by the slot and connecting said nut and said support through the slot, whereby rotation of said screw causes axial movement of the nut which results in corresponding axial movement of the support.

Figure 1:
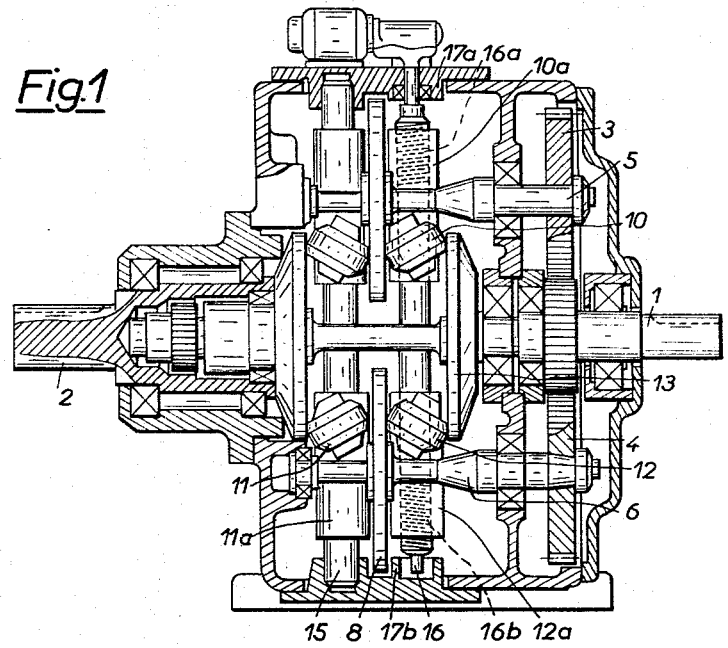
Figure 4:
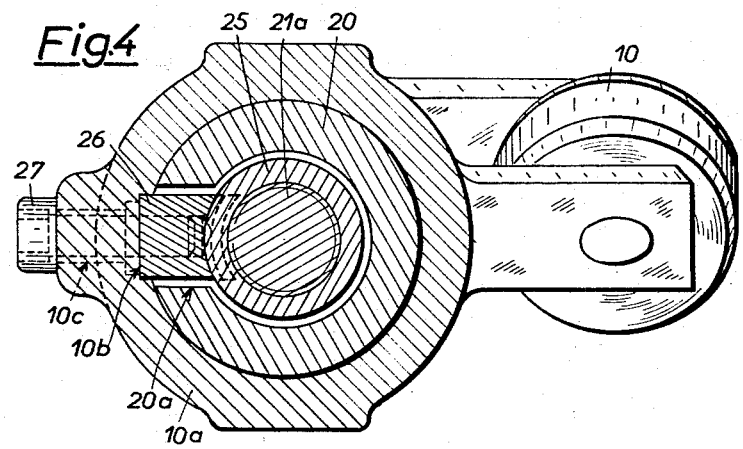
Figure 3:
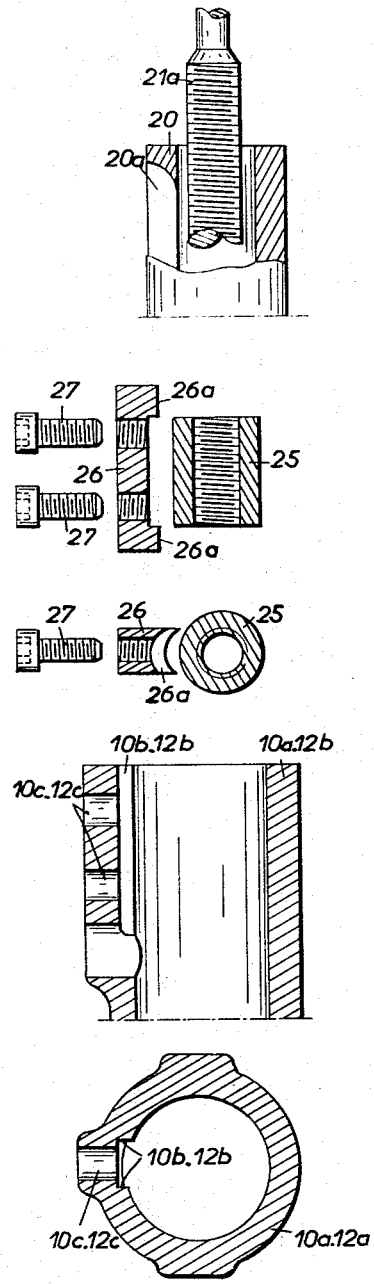
Figure 2:
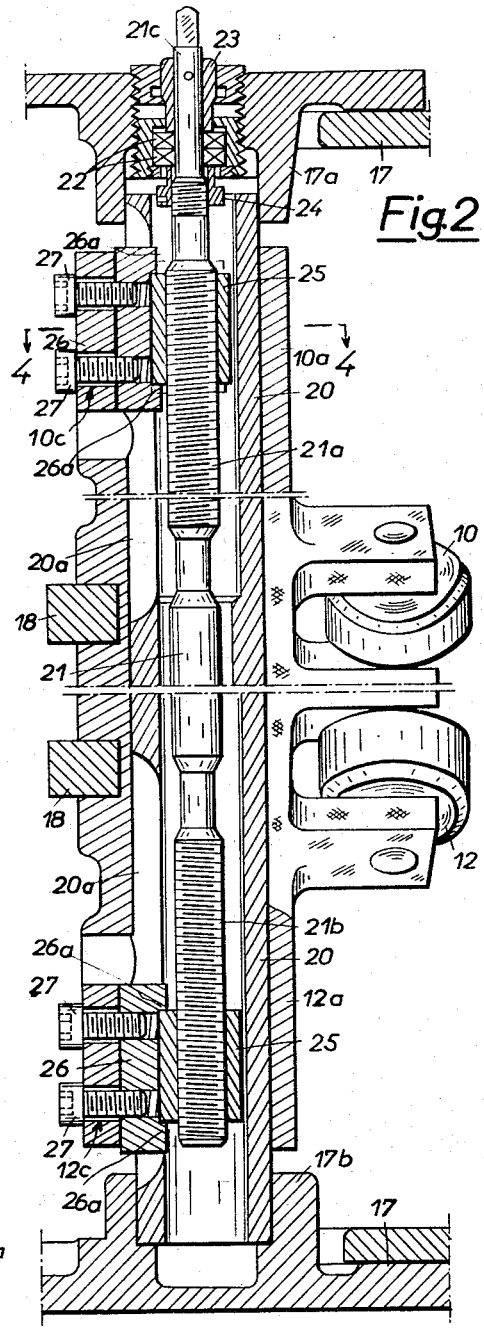

For a better understanding of the present invention reference will now be made, by way of example, to the accompanying drawings, in which:

FIGURE 1 is an axial section of a variable speed balanced pressure friction type transmission gear of variable velocity ratio, FIGURE 2 is, to a larger scale, a section of a device for regulating the velocity ratio of the transmission gear of FIGURE 1, FIGURE 3 shows separately and in section various elements of the device of FIGURE 2, and FIGURE 4 is a section, to a larger scale, on the line 4—4 of FIGURE 2.

The transmission gear of FIGURE 1 has an input shaft 1 and output shaft 2 co-axial therewith. The input shaft 1 drives gear wheels 3 and 4 mounted respectively on shafts 5 and 6 parallel and diametrically opposite with respect to the shafts 1 and 2. The shafts 5 and 6 have discs 7 and 8 respectively coaxially mounted thereon. Bi-conical rollers 9 and 10 are arranged to act upon opposite faces of the disc 7 and bi-conical rollers 11 and 12 are arranged to act on opposite faces of the disc 8. The rollers 9 to 12 are pressed against the discs 7 and 8 by a support plate 13 at the input shaft end of the gear and a receiving plate 14 at the output shaft end. The plates 13 and 14 are connected to drive the output shaft 2 by an arrangement which automatically establishes between the members 7 to 14 a pressure which is directly proportional to the resistance torque.

The rollers 9 to 12 are respectively mounted on supports 9a to 12a, the supports 9a and 11a being mounted on a column 15 and the supports 10a and 12a on a rotatable column 16. The column 16 has screw threaded portions 16a, 16b, threaded in opposite directions, which cooperate with the supports 10a and 12a so that the latter are displaced towards or away from each other in a symmetrical manner upon rotation of the column 16. The supports 9a and 11a are fixed to the supports 10a and 12a respectively so that they move symmetrically on the column 15. The upper and lower ends of the column 16 are mounted in bearings 17a and 17b.

In operation, with the input shaft 1 being rotated at constant speed, the rotational speed of the output shaft 2 can be varied by rotating the column 16 which shifts the supports 9a to 12a.

The device for controlling the position of the rollers 10 and 12 and hence regulating the velocity ratio of the transmission gear as shown in FIGURE 2 is not just a single column on which the supports for the rollers are in direct screw-threaded engagement, as indicated in FIGURE 1. The device of FIGURE 2 includes a vertical hollow column or tube 20 with a smooth exterior surface and two vertical slots 20a one above the other. The supports 10a and 12a for the rollers 10 and 12 have cylindrical portions which are a close sliding fit around the column 20. A rod 21 is arranged co-axially within the column 20 and has an upper right hand screw-threaded portion 21a and a lower left hand screw-threaded portion 21h. The lower end of the rod 21 is free and the upper end 21c of the rod 21 is mounted by means of ball-bearings 22 in the bearings 17a of the supporting frame 17 of the gear. The rod 21 is prevented from moving axially with respect to the column 20 by means of a ring 23 fixed to the upper end 21c by a pin and by means of a nut 24 engaged on a screw threaded portion 21d of the rod immediately below the upper end 21c. The ring 23 and the nut 24 contain between them the ball bearings 22.

Nuts 25 are threaded one on each of the portions 21a and 21b with clearance between them and the inside of the column 20. Each nut 25 and its adjacent slot 20a has associated therewith a substantially rectangular block 26 having a curved surface shaped to fit the outside of the nut 25 and two lugs 26a which engage over and under part of the end faces of the nut 25 so that vertical movement of the latter results in vertical movement of the block 26. Interaction between the block 26 and the nut 25 prevents rotation of the latter. The width of each block 26 is such that it is free to slide within and be guided by the slot 20a through which it projects. The support 10a has formed in its inner cylindrical surface a rectangular recess 10b to receive the outer face of the block 26 projecting from the slot 20a. The support 12a has a similar recess 12b. Apertures 10c, 12c are provided in the supports 10a, 12a extending from the recesses 10b, 12b to the outside of the supports to receive screws 27 freely therein, the screws securing the blocks 26 to the supports. It will be understood that each support 10a, 12a is prevented from rotating about the column 20 by the blocks 26 co-operating with the sides of the slots 20a.

The construction of FIGURES 2 to 4 permits precise regulating of the roller carrying supports and enables them to be guided without play over a considerable distance. At the same time the entrainment friction between the screw threads is reduced compared with that which occurs with the embodiment shown in FIGURE 1, assuming the devices to be of similar size. The screw-threaded portions 21a, 21b in the device of FIGURE 2 serve only for promoting movement of the roller supports and do not have to serve as a rigid support. This function is carried out by the column 20 which, by virtue of its smooth outer surface, does not give rise to such friction as a screw-threaded surface would. This means that the adjustment control is more sensitive and, should a servo motor be used, the power required is not as great as that needed with the arrangement of FIGURE 1.

In FIGURE 2 the references 18 indicate arms which connect the supports 10a, 12a with the supports 9a, 11a so that the device permits simultaneous control of all four rollers.

It will be understood that this regulating device can be modified for other types of transmission gears of variable velocity ratio having different numbers of rollers or where the kinematic train is different. In some circumstances the screw-threaded portions 21a, 21b of the rod 21 could be in the same direction.

It will be appreciated that the regulating device of

FIGURES 2 to 4 provides an arrangement combining in the same axial assembly, the extended guiding arrangement on a fixed column which is smooth and hollow and is of large diameter, along which are slidingly mounted the support or supports for the bi-conical rollers or other members to be regulated, and on the other hand control members comprising a screw of reduced diameter and having one or more screw-threads of opposite direction or of the same direction, the said screw being mounted for co-axial rotation within the column and co-operating, with each of its screw-threaded bearing faces, with a nut which as fast, in its axial displacement, with a slide guided in a slot formed in the hollow column, the said slide being rotationally independent of the said nut which entrains it, and the support or roller or other member to be regulated being made fast with the slide.

I claim:
1. A device for regulating a friction transmission of variable velocity ratio, the device comprising a tube formed with a slot extending along the tube, a support slidably and circumferentially mounted on the exterior of the tube, a roller element carried on said support and whose movement changes the velocity ratio of the transmission, a rotatable screw disposed within the tube and extending along same, a nut threaded on the screw, and means connecting said nut and said support through said slot.

2. A device according to claim 1, and further comprising a frame and a bearing in the frame rotatably supporting one end of said screw, said bearing including rolling elements and means for preventing axial movement of said screw.

3. A device for regulating a friction transmission of variable velocity ratio, the device comprising a tube formed with slot means extending along the tube, first and second roller elements, first and second supports slidably and circumferentially mounted on the exterior of the tube and respectively carrying said first and second roller elements, and whose movements change the velocity ratio of the transmission, a rotatable screw having first and second portions disposed within the tube and extending along same, first and second nuts threaded respectively on said first and second portions, first means connecting said first nut and said first support through said slot means and second means connecting said second nut and said second support through said slot means.

4. A device according to claim 3, wherein said first and second portions are threaded in opposite directions.

References Cited by the Examiner

UNITED STATES PATENTS

| | | | |
|---|---|---|---|
| 2,770,976 | 11/1956 | Frantz et al. | 74—194 |
| 3,010,330 | 11/1961 | Perruca | 74—200 |
| 3,220,718 | 11/1965 | Wikkerink | 74—424.8 X |

DAVID J. WILLIAMOWSKY, *Primary Examiner.*

L. H. GERIN, *Examiner.*